(12) United States Patent
Sierra

(10) Patent No.: US 9,135,951 B2
(45) Date of Patent: Sep. 15, 2015

(54) SYSTEM AND METHOD FOR DYNAMIC AUDIO BUFFER MANAGEMENT

(75) Inventor: Frankie Sierra, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1983 days.

(21) Appl. No.: 11/546,000

(22) Filed: Oct. 10, 2006

(65) Prior Publication Data

US 2008/0091851 A1 Apr. 17, 2008

(51) Int. Cl.
| | |
|---|---|
| *G06F 3/00* | (2006.01) |
| *G06F 5/00* | (2006.01) |
| *G06F 17/00* | (2006.01) |
| *H04L 12/26* | (2006.01) |
| *H04L 12/54* | (2013.01) |
| *G10L 21/00* | (2013.01) |
| *G10L 19/00* | (2013.01) |
| *G11B 20/10* | (2006.01) |
| *G06F 3/16* | (2006.01) |

(52) U.S. Cl.
CPC ............ *G11B 20/10527* (2013.01); *G06F 3/16* (2013.01); *G11B 2020/10546* (2013.01); *G11B 2020/10629* (2013.01); *G11B 2020/10722* (2013.01); *G11B 2020/10759* (2013.01)

(58) Field of Classification Search
None
See application file for complete search history.

(56) References Cited

U.S. PATENT DOCUMENTS

| | | | | |
|---|---|---|---|---|
| 5,265,250 | A * | 11/1993 | Andrade et al. | 718/101 |
| 5,487,167 | A * | 1/1996 | Dinallo et al. | 715/203 |
| 5,717,154 | A * | 2/1998 | Gulick | 84/604 |
| 6,298,370 | B1 | 10/2001 | Tang et al. | |
| 6,301,258 | B1 * | 10/2001 | Katseff et al. | 370/412 |
| 7,346,512 | B2 * | 3/2008 | Li-Chun Wang et al. | 704/270 |
| 7,634,227 | B2 * | 12/2009 | de Jong | 455/3.06 |
| 2002/0133249 | A1 * | 9/2002 | Fay et al. | 700/94 |
| 2003/0163328 | A1 * | 8/2003 | Rambo et al. | 704/500 |
| 2003/0208359 | A1 | 11/2003 | Kang et al. | |
| 2004/0105009 | A1 * | 6/2004 | Takahashi et al. | 348/207.99 |
| 2006/0023729 | A1 * | 2/2006 | Choi et al. | 370/428 |
| 2006/0041895 | A1 | 2/2006 | Berreth | |
| 2006/0056383 | A1 * | 3/2006 | Black et al. | 370/350 |
| 2007/0206505 | A1 * | 9/2007 | Forbes | 370/252 |
| 2007/0283033 | A1 * | 12/2007 | Bloebaum et al. | 709/231 |

FOREIGN PATENT DOCUMENTS

EP  1 860 555 A2  11/2007

OTHER PUBLICATIONS

Lazzaro, John and Wawrzynek, John, "The Sfront Reference Manual: Part II/3: Audio Drivers"; Jul. 30, 2006; http://www.csberkeley.edu ; 13 pages; Part II/1: Installing Sfront; 7 pages. A8.*

(Continued)

*Primary Examiner* — Farley Abad
*Assistant Examiner* — Henry Yu
(74) *Attorney, Agent, or Firm* — Norton Rose Fulbright US LLP

(57) ABSTRACT

An audio data processing circuit comprises a memory and a processing circuit. The processing circuit is configured to store audio data in the memory in at least one buffer, each buffer having a size. The processor is configured to detect a type of application providing the audio data and, based on the type of application detected, to change at least one of the size and number of buffers in which the processing circuit stores audio data.

11 Claims, 8 Drawing Sheets

(56) References Cited

OTHER PUBLICATIONS

He, Guanghui, Xu, Ningyi, Yu, Wei and Zhou, Zucheng, "A Single Receiving Chip for DVB Data Broadcasting System"; IEEE Transactions on Consumer Electronics, vol. 52.*

International Search Report and Written Opinion of the International Searching Authority of International Application No. PCT/US2007/080596; mailed Mar. 6, 2008; 14 pages.

Lazzaro, John and Wawrzynek, John, "The Sfront Reference Manual: Part II/3: Audio Drivers"; Jul. 30, 2006; http://www.csberkeley.edu ; 13 pages; Part II/1: Installing Sfront; 7 pages.

He, Guanghui, Xu, Ningyi, Yu, Wei and Zhou, Zucheng, "A Single Receiving Chip for DVB Data Broadcasting System"; IEEE Transactions on Consumer Electronics, vol. 52, No. 3, Aug. 2006; pp. 1084-1091.

* cited by examiner

SYSTEM AND METHOD FOR DYNAMIC AUDIO BUFFER MANAGEMENT

BACKGROUND

Electronic devices are used to run different types of applications. Some applications have greater user interactivity than others. For example, an application which plays an MP3-format audio file typically has less user interactivity than a gaming application.

For applications having greater interactivity, the output of audio should be responsive, requiring a lower latency between the application layer and the audio chip. Lower latency provides audio output that most closely matches the video output associated with the game. For applications having lesser interactivity, the output of audio should have a greater latency, which helps minimize audio stutter.

Audio buffer management is conventionally designed for either high latency applications or low latency applications, or for a compromise between the two.

There is a need for a system and method for improving audio buffer management in a device which may run both high latency and low latency applications. Further, there is a need for a system and method for improving audio buffer management in a device which can operate applications having latency requirements not known at the time of manufacture of the device. Further still, there is a need for a system and method for adapting an audio buffer management scheme dynamically and transparently to accommodate a variety of different applications.

DETAILED DESCRIPTION OF EXEMPLARY EMBODIMENTS

Figure 2:
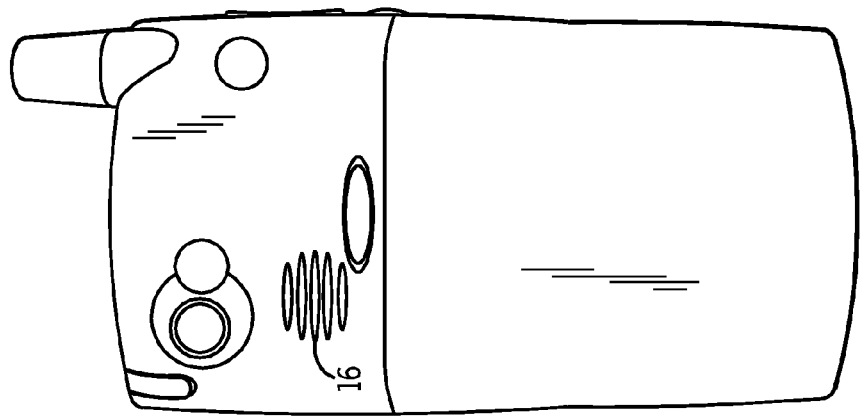
FIG. 2 is a back view of a mobile computing device, according to an exemplary embodiment.
Figure 1:
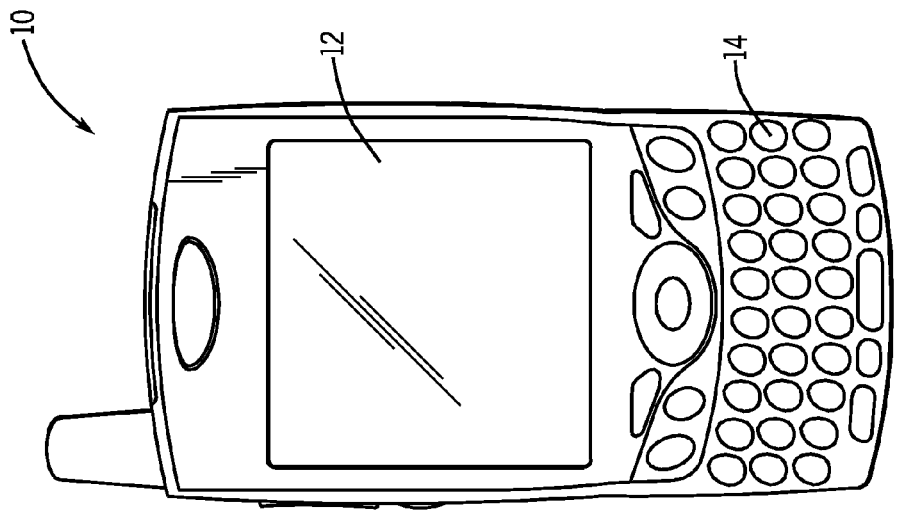
FIG. 1 is a front view of a mobile computing device, according to an exemplary embodiment.

Referring first to FIG. 1, a mobile computing device 10 is shown. The teachings herein can be applied to device 10 or to other electronic devices (e.g., a desktop personal computer) or other mobile computing devices (e.g., a laptop computer). Device 10 is a smart phone, which is a combination mobile telephone and handheld computer having personal digital assistant functionality. Personal digital assistant functionality can comprise one or more of personal information management, database functions, word processing, spreadsheets, voice memo recording, etc. Device 10 comprises a display 12, a user input device 14 (e.g., a QWERTY keyboard, buttons, touch screen, speech recognition engine, etc.). As shown in FIG. 2, device 10 also comprises a speaker 16.

Figure 3:
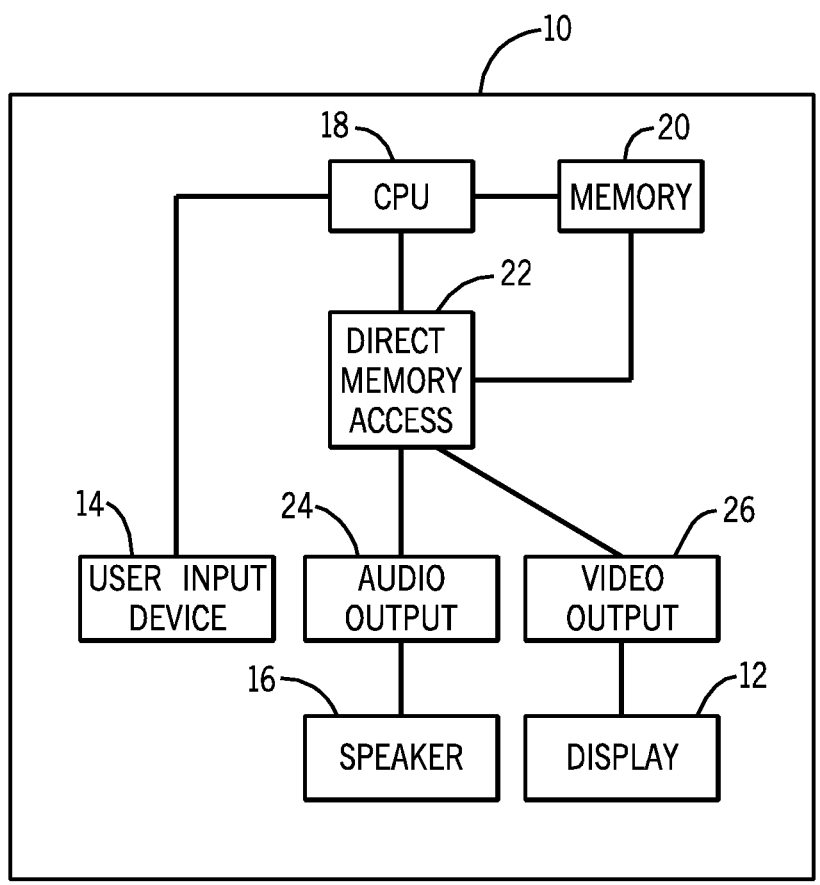
FIG. 3 is a block diagram of the mobile computing device of FIGS. 1 and 2, according to an exemplary embodiment.

Referring now to FIG. 3, a block diagram of device 10 is shown. A central processing unit (CPU) 18 is provided, along with a memory 20, which can comprise volatile and/or non-volatile memory (e.g., ROM, programmable ROM, flash, etc.), a direct memory access 22, an audio output 24, and a video output 26. The components of device 10 can comprise these and/or other electronic hardware and/or software components configured to run a plurality of software applications for use by a user of device 10. For example, an audio playing application (e.g., an MP3 player) or other media streaming application can be provided, as well as game applications, word processing applications, etc. Device 10 is configured to run a plurality of applications known to the manufacturer of device 10 and applications unknown to the manufacturer of device 10. Applications may have a need for providing audio data via audio output 24 to speaker 16 or other audio output devices (e.g., headphones, etc.) and video output to the user via video output 26 to display 12 or other video output devices.

The applications can be stored in memory 20 and run by CPU 18 either alone or with the assistance of direct memory access (DMA) 22. DMA 22 allows hardware subsystems within device 10 to access memory 20 for reading and/or writing independent of the CPU.

Figure 4:
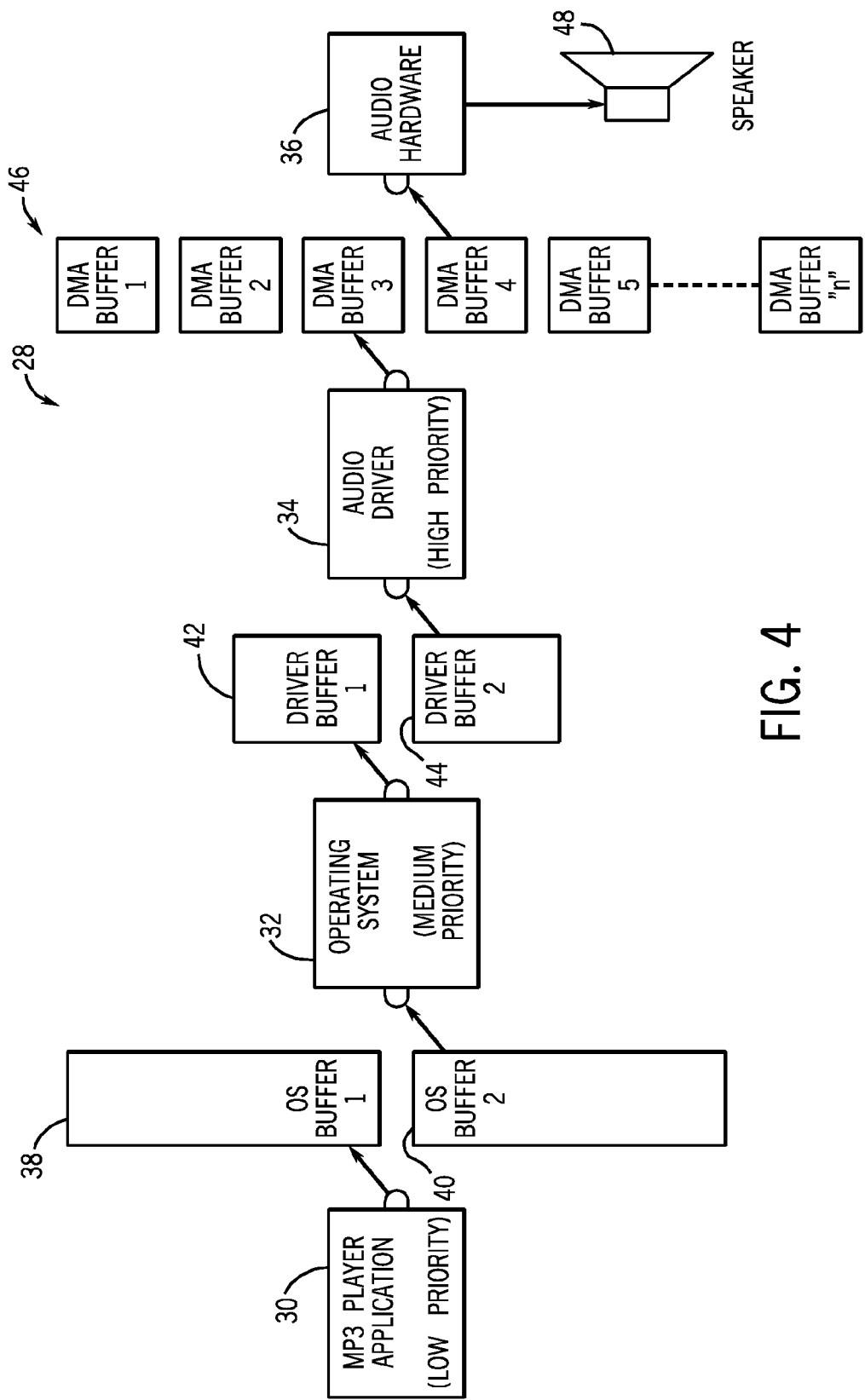
FIG. 4 is a block diagram of an audio buffer management scheme, according to an exemplary embodiment.

Referring now to FIG. 4, a block diagram of an audio buffer management system and method is shown. FIG. 4 shows a processing circuit 28, which can comprise one or more of an application layer 30, an operating system layer 32, an audio driver layer 34, and audio hardware 36. Processing circuit 28 can comprise a single chip design, a multiple chip design, a multi-core chip design, programmable logic, an application-specific integrated circuit, hardware, software, firmware, or further components, or other arrangements in various alternative embodiments. In one exemplary embodiment, layers 30, 32 and 34 are operable on CPU 18 (e.g., part of a microprocessor or other chip) along with DMA 22 and memory 20 (see FIG. 1). CPU 18 and DMA 22 can comprise one or more chips. In this exemplary embodiment, an Intel XScale Processor PXA270 CPU/DMA chip may be used, manufactured by Intel Corp., Santa Clara, Calif.

In an exemplary embodiment, an application layer 30 runs an application with a relatively low priority for CPU processing time. A memory manager of CPU 18 is configured to create in memory 20 operating system buffers 38, 40 in a random access memory (RAM). While a double-buffer arrangement is shown in this exemplary embodiment, any number of buffers may be created. Processing circuit 28 is configured to store audio data in buffer 38 while buffer 40 provides audio data to operating system layer 32. While operating system buffer 38 is being created or filled, operating system buffer 40 is being read from by operating system 32. Once operating system buffer 40 has processed all data through operating system layer 32, buffer 40 is released to be filled again by application layer 30.

In a similar manner, operating system layer 32 fills driver buffer 42 while driver buffer 44 is providing data to audio driver 34. Operating system layer 32 has a medium priority, which is a higher priority than application layer 30, but a lower priority than audio driver 34 for CPU time usage. As a result, operating system buffers 38, 40 are typically larger than driver buffers 42, 44 to prevent stuttering or gaps in the transmission of audio data along processing circuit 28.

Audio driver 34 provides audio data with a high priority of CPU run time to one or more DMA buffers 46. In this example, DMA buffer 3 is being filled by audio driver 34 while DMA buffer 4 is providing audio data to audio hardware 36 for play on speaker 48. Audio hardware 36 can comprise one or more circuits or chips. In this exemplary embodiment, audio hardware 36 can comprise a Wolfson AC97 Audio Codec WM9712, manufactured by Woflson Microelectronics plc, Edinburgh, UK.

In a system in which the manufacturer is unfamiliar with the types of applications a user may run on application layer 30, the flow of audio data may require processing to accommodate system interruptions to reduce stuttering (e.g., gaps of silence). For an application requiring lower latency between layer 30 and audio hardware 36, OS buffers 38, 40 are made smaller in order to improve the interactivity of audio exiting processing circuit 28, so that the audio data being played on speaker 48 more closely matches associated video display. For example, in games where the user controls real time action, sounds should closely match what is happening on the video display.

In FIG. 4, a large number "N" of buffers 46 (e.g., which can be 6, 12, 20 or more) allows for more data to be stored in DMA buffers 46. DMA buffers 46 filled with data are shown in black and buffers 46 being filled by audio driver 34 are shown in white. Providing large buffers at the operating system buffer layer 38, 40 makes the playback of audio data more interruption tolerant. DMA 22 (FIG. 1) uses DMA buffers 46 to continue to play audio even when applications or components (which may not be known or controlled by the manufacturer of device 10) cause interrupts or delays in CPU processing. DMA buffers 46 allow audio driver 34 to tolerate longer interruptions in CPU usage, while DMA 22 continues to transfer data to audio hardware 36 in order to maintain smooth playback.

Figure 5:
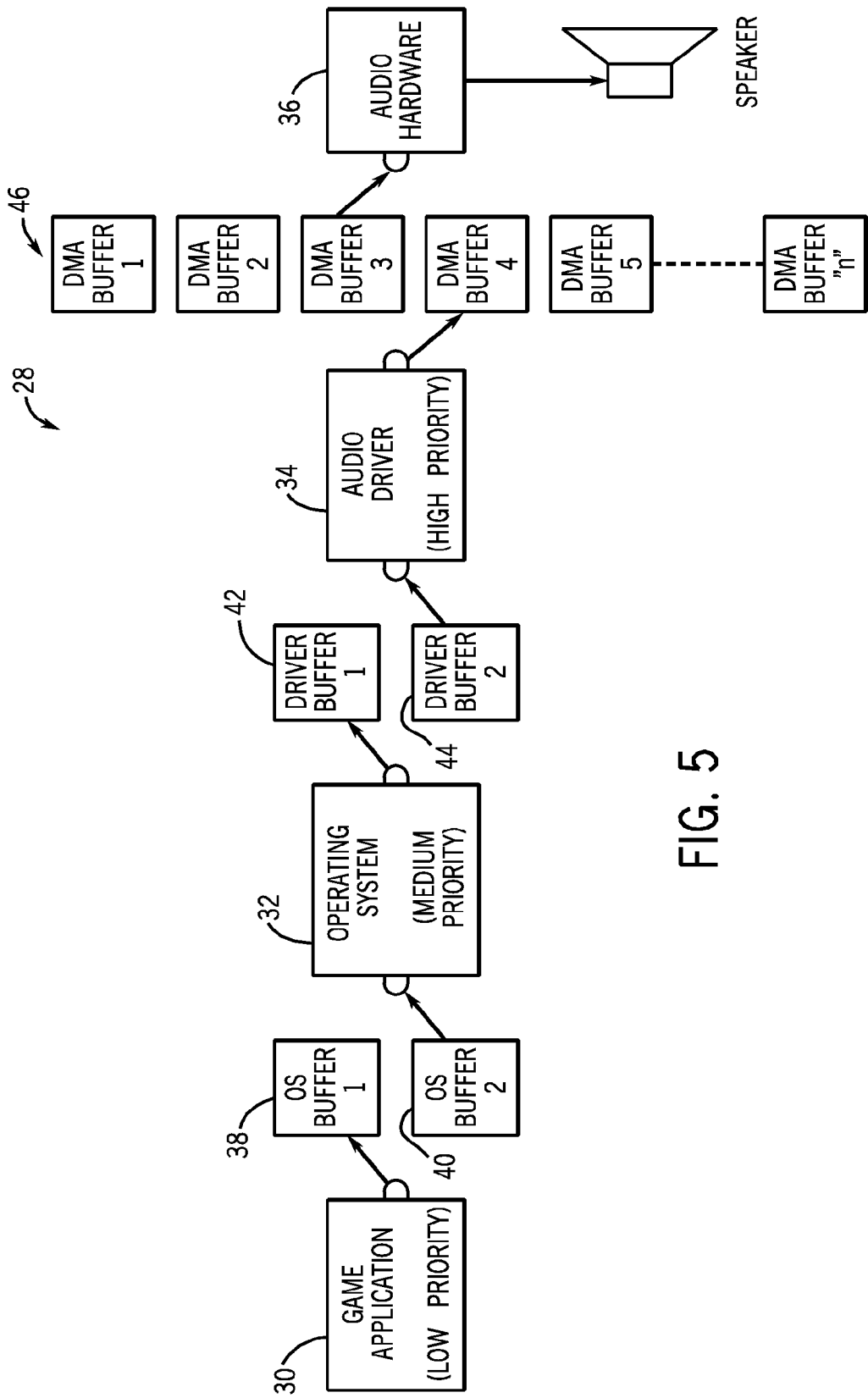
FIG. 5 is a block diagram of an audio buffer management scheme, according to an exemplary embodiment.

Referring now to FIG. 5, processing circuit 28 is configured to detect a type of application providing the audio data and, based on the type of application detected, to change at least one of the size and number of buffers in which processing circuit 28 stores audio data. In the example shown in FIG. 5, processing circuit 28 has determined that the application playing on application layer 30 is an interactive application, a low latency application, and/or an application having a lower latency than other applications. Processing circuit is configured to use DMA buffers 3 and 4, but not DMA buffers 1, 2, 4, 5 . . . N in order to improve the latency of audio data between application layer 30 and audio hardware 36. While two of buffers 46 are used in this example, other numbers of buffers may be used, such as 3, 4, etc. In this exemplary embodiment, processing circuit 28 created N DMA buffers in RAM before playing audio data with a memory manager. However, upon detecting or identifying a type of application (e.g., an interactive or low latency application) processor 28 then is configured to limit the use of DMA buffers 46 to only 2, or another number less than N. According to one exemplary embodiment, audio driver 34 is configured to limit the number of DMA buffers 46 used to process the audio data to at least one, and optionally a few, less than the total number of buffers available N (as predetermined by the memory manager or another pre-set mechanism). In other words, when the DMA buffer playing is Y, the buffer filling up is <=Y+c, where c can be 1 or 2 buffers ahead of buffer Y. In this example, DMA buffers need not be reprogrammed. Rather, the processing circuit 28 controls how many buffers ahead of buffer Y will be filled with audio data.

Processing circuit 28 is also configured in this exemplary embodiment of FIG. 5 to establish buffers 38, 40 in a smaller size than would be used when other applications are running, such as MP3 player application shown in FIG. 4. This reduction in size or provision of a smaller size buffer at the operating system layer, and also optionally at the driver buffer layer 42, 44 and/or DMA buffer layer 46 improves the latency of audio data from application layer 30 to audio hardware 36 and also improves the interactivity (low latency).

Processing circuit 28 can detect or identify the type of application based on any number of methods or configurations. For example, processing circuit 28 can be configured to use an application programming interface (API) to indicate that an audio channel for an application running an application layer 30 should be identified as a low latency application. In this example, application layer 30 provides a signal, API message, or flag indicating the audio data type (e.g., low latency, high latency, etc.). Audio driver 34 is configured to receive the API message and to determine or control the buffer size and/or number for DMA buffers 46. As another example, audio driver 34 can be configured to detect the playing of silence over an audio channel for more than a predetermined period of time (e.g., 3 seconds). Some applications requiring low latency, such as game applications, provide an open audio channel with digital silence in order to prevent the device 10 and/or audio hardware 36 from shutting down, turning off, or going into a sleep mode. Accordingly, audio driver 34 or another portion of processing circuit 28 can be configured to monitor an audio channel provided by an application playing application layer 30 in order to detect whether the application is a low latency application. In this manner, device 10 need not modify or update the game application, but rather can identify whether the application is a low latency (e.g., or in an alternative embodiment, a high latency or other latency characteristic) of the application by monitoring an existing data output. According to one exemplary embodiment, the layer 30, 32, or 34 which determines the number and/or size of buffers 38-40, 42-44, or 46, respectively, is configured to receive the message or monitor the audio channel (or use another method) to determine the type of application being run on application layer 30.

According to one exemplary embodiment, the API message can be provided in a manner which is transparent to the operating system 32. For example, an existing operating system layer parameter can be overloaded or modified in a manner that travels through operating system 32 unchanged. For example, an audio volume parameter which is passed through operating system 32 to audio driver 34 can be overloaded with a message indicating the type of application (e.g., low latency, high latency, etc.). Overloading refers to having more than one way in which a signal, message, or word can be interpreted, depending on the context. For example, when the audio volume parameter is overloaded, it conveys both volume and stream type, both merged into a single composite number or message.

While FIG. 5 shows an implementation in which processing circuit 28 changes the number of direct memory access buffers 46 used based on the type of application detected, in an alternative embodiment, the size of one or more of buffers 46 can be adjusted or changed (e.g., decreased to improve latency). As a further alternative, processing circuit 28 can be configured to change at least one of the size and number of buffers of operating system buffer 38, 40 and/or driver buffer 42, 44 in response to the type of application detected.

Processing circuit can be configured to identify the application as one of a high latency, low latency, or other latency characteristic of the application. For example, a gaming application and a phone call application can be identified as low latency applications, and a media streaming application, such as MP3 or webcast video and/or webcast audio (e.g., a podcast) can be identified as a high latency application. The variable nature of internet packet transmissions can be one indicator of a high-latency application, due to the need for a large amount of buffering. Another type of application can be a variable latency application, such as a Push To Talk (PTT) audio application, as used in Walkie-Talkie features in some networks. In these networks, a user may push a button and start talking; the audio data is buffered until the network finally connects a non-ringing call to the destination. The time it takes to connect will define how much latency will be in effect.

Figure 6:
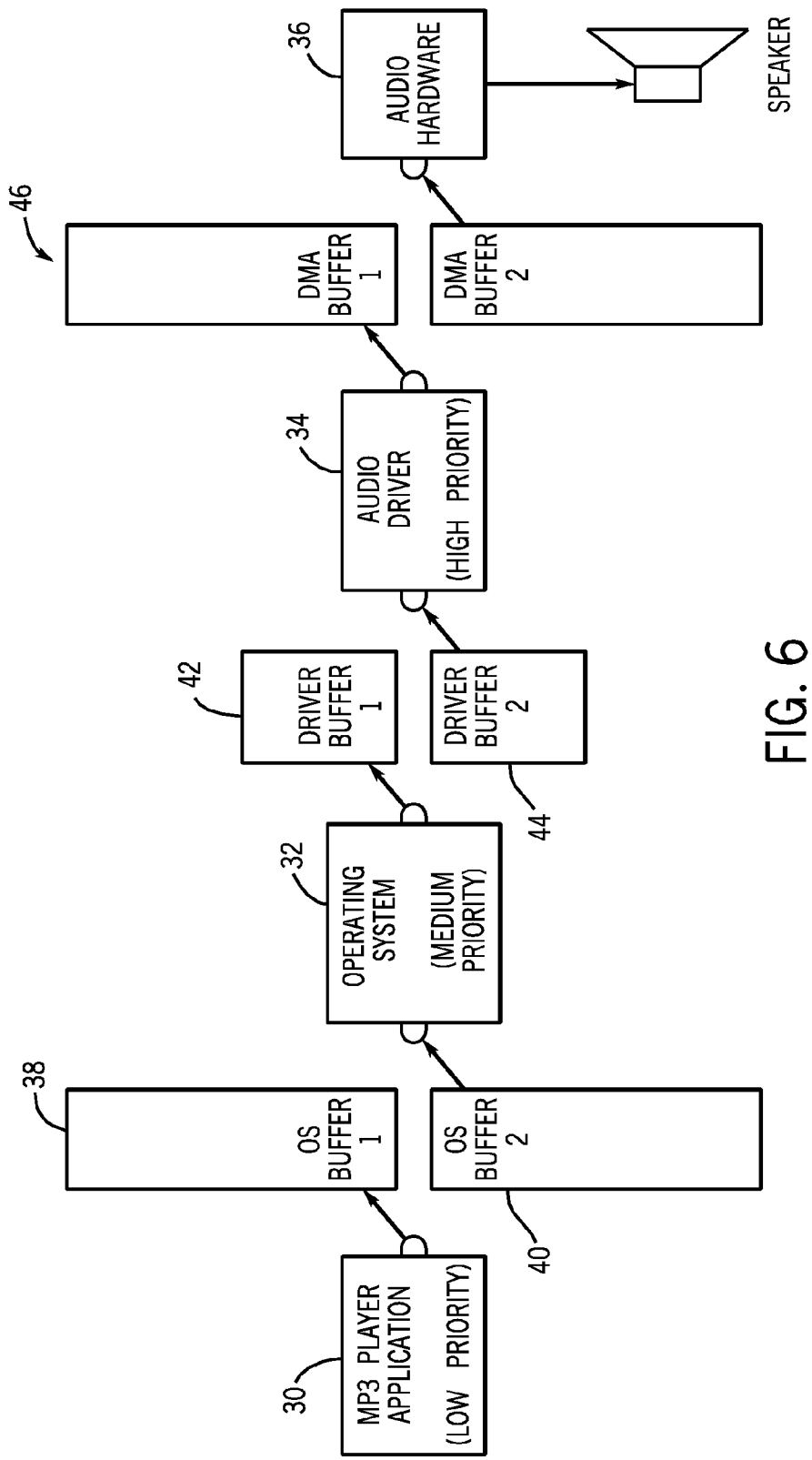
FIG. 6 is a block diagram of an audio buffer management scheme, according to an exemplary embodiment.

As shown in FIG. 6, processing circuit can be configured to provide a change, adjustment, or modification of buffering in response to the type of application being run at application layer 30 by increasing or decreasing the size of any of buffers 38, 40, 42, 44, or 46. In the example shown in FIG. 6, a high latency application is identified by processing circuit 28 and, therefore, processing circuit 28 selects a larger size for each of two DMA buffers 46 to make processing circuit 28 interruption-tolerant. In this exemplary embodiment, should processing circuit 28 detect or identify the playing of an application requiring a lower latency, such as a game application, processing circuit is configured to reduce or set a smaller size for buffers 46, but maintain the number of buffers at two (or some other predetermined number).

According to one exemplary embodiment, processing circuit 28 is configured to create buffers in memory 20 at or near the beginning of playback of audio from application layer 30 by designating the buffer number and size. Making a change to a buffer size or number in RAM can be difficult when RAM is actively in use. Accordingly, in one exemplary embodiment, processing circuit 28 is configured to create or preset a number of buffers (e.g., a maximum number of buffers) and, prior to or during playback, decide how many buffers will be filled based on the type of application detected.

According to another exemplary embodiment, processing circuit 28 is configured to preset or pre-allocate a predetermined buffer size (e.g., a maximum buffer size) for the double-buffer embodiment shown in FIG. 6 or at or near the beginning of playback and to resize buffers 46 by way of a DMA controller configuration, thereby avoiding the need to modify buffer sizes in memory in RAM. Advantageously, this embodiment avoids the use of the memory manager to reallocate RAM while audio playback is running.

Figure 7:
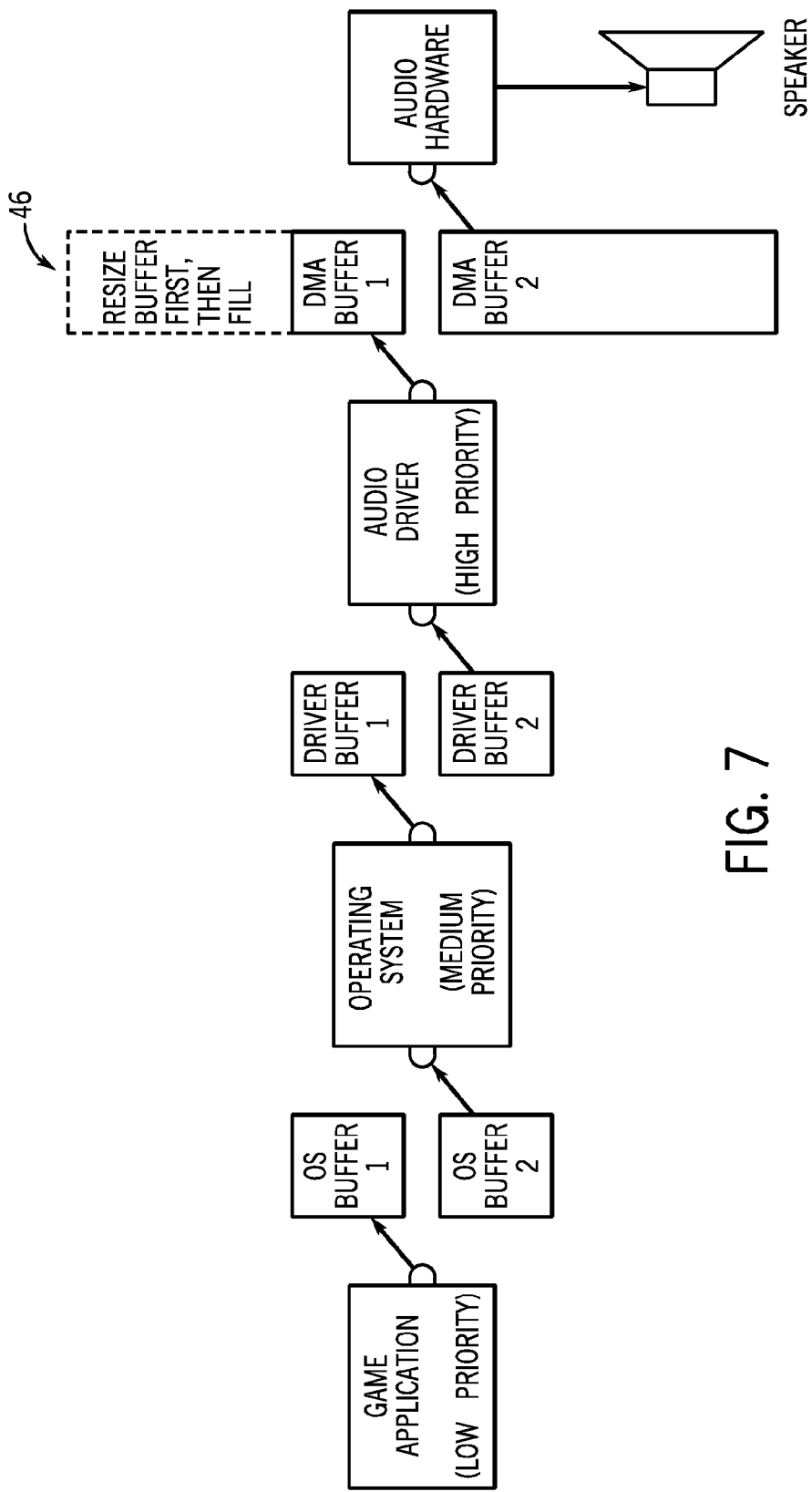
FIG. 7 is a block diagram of an audio buffer management scheme, according to an exemplary embodiment.
Figure 8:
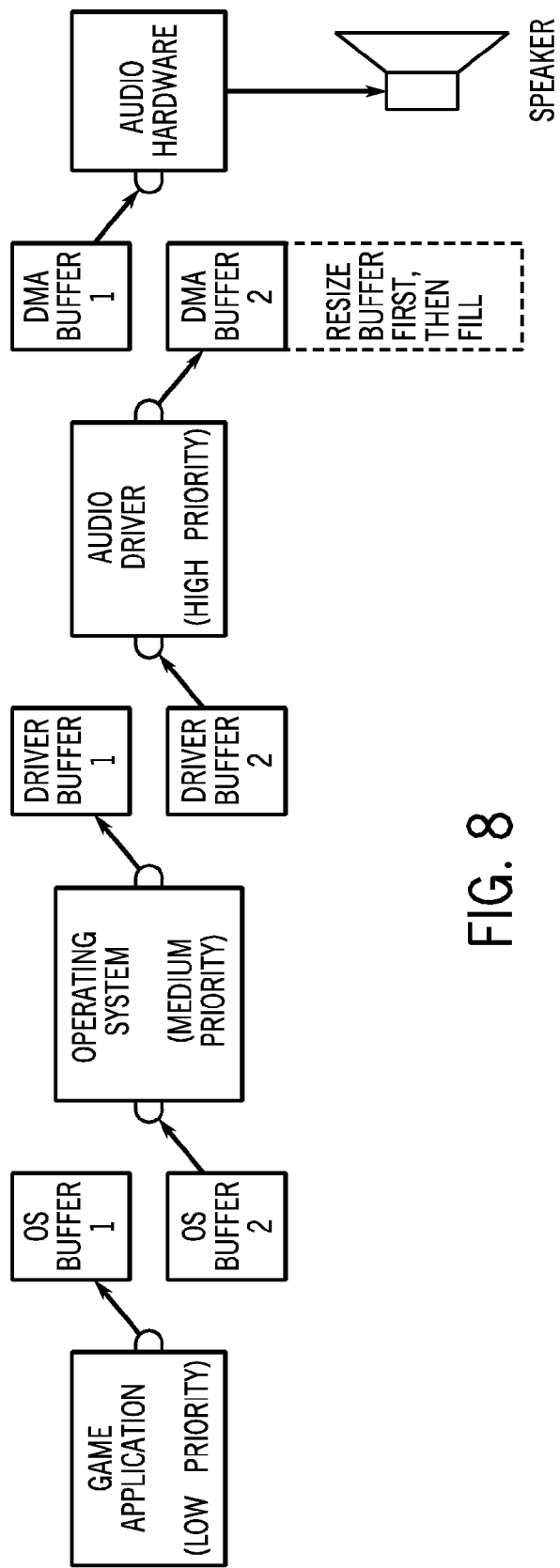
FIG. 8 is a block diagram of an audio buffer management scheme, according to an exemplary embodiment.

As shown in FIG. 7 and FIG. 8, processing circuit 28 is configured to detect a change from running a high latency application to running a low latency application and to resize DMA buffer 1 by instructing DMA 22 to only use a portion of the buffer allocated in RAM by the memory manager.

According to another exemplary embodiment, application layer 30 may be configured to run a plurality of applications simultaneously or concurrently, wherein audio data from the applications is intermingled or mixed at audio driver 34, resulting in a single data output channel to DMA buffers 46. In this example, it is possible that DMA buffers 46 simultaneously carry data for both high latency and low latency channels. Processing circuit 28 can be configured to use the buffer size and/or number scheme applicable to the low latency (e.g., "interactive") application. According to a further exemplary embodiment, processing circuit 28 can be configured to switch back to the buffer management scheme for high latency (e.g., "streaming") applications upon detecting that all audio channels associated with low latency applications are closed or finished. In one exemplary scenario, audio data from a phone call application will have the highest priority and mute audio data from all other applications; audio data from a game application will play mixed with other audio types, but processing circuit 28 provides a low latency playback scheme using DMA buffers 46; audio data from an MP3 player application will play with a high latency scheme provided audio from the phone call application and game application are not present.

According to an exemplary embodiment, latencies for a plurality of different applications can be handled by processing circuit 28 dynamically (e.g., without user interaction) based on the application which is running.

According to an exemplary advantage, in one embodiment, applications such as streaming applications requiring a higher playback latency can sustain more interruptions without interrupting playback (e.g., minimize stutter), while interactive applications (e.g., requiring lower playback latency) can more closely align audio with video outputs on the display. According to another advantage, in an exemplary embodiment, unknown applications need not be modified to provide certain advantages. According to another exemplary embodiment, audio buffer management is done dynamically and variably to adapt to underlying running application requirements.

As described hereinabove, processing circuit 28 can be configured to detect the type of application and/or identify a characteristic of the application associated with a desired latency. An application can request a predetermined latency requirement, by way of a message, request, flag, etc. Alternatively, active audio channels can be monitored by processing circuit 28 to detect silence or other characteristic of the application indicative of a desired latency setting.

According to another exemplary embodiment, if a low latency or interactive channel is present, processing circuit 28 is configured to dynamically lower the amount of DMA buffering provided to support interactive playback.

According to another exemplary embodiment, in the absence of interactive or low latency channels, DMA buffers are allowed to build up when continuous streamed audio is being played. An increase or decrease in buffer number and/or size can be in a single step or in a plurality of steps, each step gradually increasing and/or decreasing the buffer number and/or size over time.

According to another exemplary embodiment, short duration audio is played with minimal latency.

According to one exemplary embodiment, audio driver 34 can output 48 kHz sample data to audio hardware 36. Each sample can take 4 bytes of memory space. A buffer that represents 20 milliseconds of audio data occupies 3840 bytes. In an exemplary embodiment, DMA buffers 46 can comprise 10 buffers sized at 3840 bytes (see, e.g., FIG. 4), representing a maximum latency of up to 200 milliseconds. When audio driver 34 is configured to use only two of DMA buffers 46, reconfiguring dynamically using one of the embodiment described hereinabove, buffers 46 can each be initialized with 19200 bytes or up to 100 milliseconds of audio data per buffer (see, e.g., FIG. 6).

Figure 9:
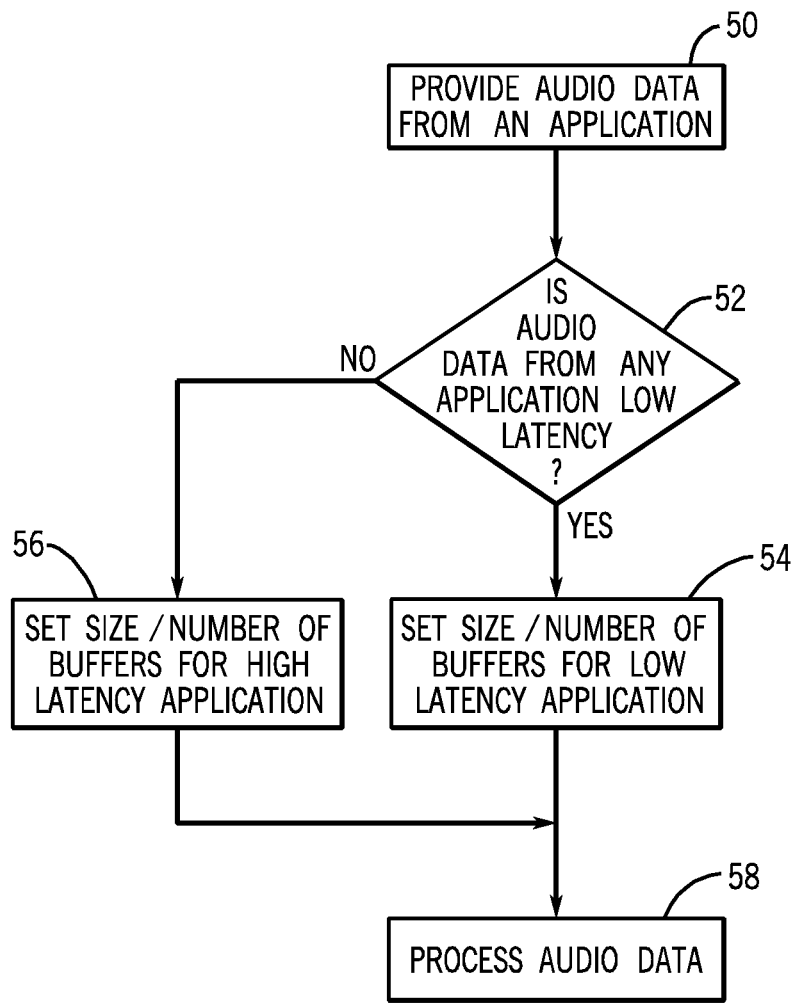
FIG. 9 is a flowchart of an audio buffer management scheme, according to an exemplary embodiment.

Referring now to FIG. 9, a flowchart of an exemplary audio buffer management scheme is shown. At step 50, audio data is provided from an application. At step 52, processing circuit 28 is configured to identify whether audio data from any application audio channel is an application of the type or characteristic requiring a low latency buffer management scheme. If so, at step 54, the size and/or number of buffers in at least one of operating system buffers 38, 40, driver buffers 42, 44 and/or DMA buffers 1 . . . N 46 are set for a low latency application. If not, said buffers are set for a high latency application 56. At step 58, audio data is processed in accordance with the buffers set. As discussed hereinabove, other steps may also be provided, such as provisioning buffers in RAM with the memory manager and then adjusting the size and/or number of buffers dynamically by way of instructions to one or more of the layers or drivers in processing circuit 28, such as a DMA controller.

While applications have been identified in some exemplary embodiments based on latency requirements, other characteristics of the applications can be identified and used to change (e.g., dynamically) the size and/or number of buffers. Processing circuit 28 can be configured to detect if an audio data stream is paused/resumed multiple times, which can be indicative of interactive during the period of pause/resume activity. Processing circuit 28 can be configured to detect if an audio data stream starves (i.e., no more data is available when needed) for more than a few seconds, which can be indicative of a higher latency application. Processing circuit 28 can be configured to monitor network and/or hard drive/disk activity and correlate the audio data stream activity to a best guess for a need for higher latency (e.g., the network could correlate to a webcast identification, while the disk activity could correlate to an MP3 playback). Processing circuit 28 can be configured based on detecting a phone call connect to change rules giving priority to phone call audio at low latency. Processing circuit 28 can be configured to identify the audio stream characteristics, such as playback frequency (8 kHz, 44.1 kHz, 48 kHz), number of audio channels per sample, number of bytes per sample, and also the original encoding used (WAV, MP3, MPG, MIDI, etc.) and adjust at least one of buffer size and/or number based on these or other audio stream characteristics. Processing circuit 28 can be configured to identify the application name that created the audio data streams to provide the best buffer scheme (e.g., RealPlayer, pTunes, and known MP3 players in the Palm Operating System can be indicative of higher latency applications). In this example, processing circuit 28 can be configured to store a look-up table of application names with associated latency requirements. Processing circuit 28 can identify user and/or usage profiling to identify the characteristics of the audio stream being played. In this example, processing circuit 28 can be configured to keep a history of stream usage on a daily basis and profile the typical stream types required to best guess other days in which no other information is available. For example, a user may listen to a news broadcast always early in the morning and play games at lunch time. Through historical gathering and averaging, processing circuit 28 can predict that usage for future dates and base the number and/or size of buffers used on the prediction.

While the exemplary embodiments illustrated in the Figs. and described above are presently exemplary, it should be understood that these embodiments are offered by way of example only. For example, while three layers of buffers are shown in this exemplary embodiment, any number of layers of buffers can be used. As another example, DMA 22 can be configured to provide a buffer with separate read, write and threshold pointers, wherein the pointers are programmed to emulate the variable size buffers of FIGS. 7 and 8. Audio hardware 36 can be configured to operate with the read pointers, while audio driver 34 can be configured to operate with the write pointers. Accordingly, the present invention is not limited to a particular embodiment, but extends to various modifications that nevertheless fall within the scope of the appended claims.

What is claimed is:

1. An audio data processing circuit for use in a mobile telephone, comprising:
   a memory; and
   a processing circuit configured to store audio data in the memory, the memory including at least one buffer, each buffer having a type and a size, wherein the processing circuit is configured to identify an application providing the audio data as one of a high latency application and a low latency application, and based upon the type of application identified, to select a type of buffer from the group of an operating system buffer, an audio driver buffer and a direct memory access buffer, and to change the size or the number of buffers in which the processing circuit stores the audio data, wherein the processing circuit is configured to detect that a phone call application is providing the audio data and to change the size or the number of buffers based upon the detected phone call application.

2. The circuit of claim 1, wherein the processing circuit is configured to identify a gaming application as a low latency application.

3. The circuit of claim 1, wherein the processing circuit is configured to identify a gaming application as a low latency application.

4. The circuit of claim 1, wherein the processing circuit is configured to read the audio data from the at least one buffer and to store the audio data in a second at least one buffer, each of the second at least one buffers having a size, wherein, based on the type of application detected, the processing circuit is configured to change the size or the number of the second at least one buffers in which the processing circuit stores audio data.

5. The circuit of claim 4, wherein the processing circuit is configured to read the audio data from the second at least one buffer and to store the audio data in a third at least one buffer, each of the third at least one buffers having a size, wherein, based on the type of application detected, the processing circuit is configured to change the size or the number of the third at least one buffers in which the processing circuit stores audio data.

6. The circuit of claim 1, wherein the application providing the audio data is configured to send a message identifying itself as a high latency or low latency type.

7. The circuit of claim 1, wherein the processing circuit is configured to monitor an audio channel to detect whether the application is a low latency application.

8. A method of audio buffer management in a mobile telephone, comprising:
   providing audio data from a first application;
   identifying a characteristic of the first application, wherein the characteristic represents whether the first application is a high latency application or a low latency application;
   selecting a type of buffer for a first at least one buffer from the group of an operating system buffer, an audio driver buffer and a direct memory access buffer based on the characteristic of the first application;
   setting a size or a number of the first at least one buffer based on the characteristic of the first application;
   storing the audio data from the first application in the first at least one buffer;
   providing audio data from a second application;
   identifying a characteristic of the second application, wherein the characteristic represents a different latency than the first application;
   selecting a type of buffer for a second at least one buffer from the group of an operating system buffer, an audio driver buffer and a direct memory access buffer based on the characteristic of the second application;
   setting a size or a number of the second at least one buffer based on the characteristic of the second application; and
   storing the audio data from the second application in the second at least one buffer.

9. The method of claim 8, further comprising monitoring an audio channel to detect whether the application is a low latency application.

10. A mobile computing device, comprising:
- a display;
- a user input device;
- a memory;
- an audio output; and
- a processing circuit configured to run an application which provides video data to the display, audio data to the audio output, and receives user input data from the user input device, wherein the processing circuit configured to store audio data in the memory, the memory including at least one buffer, each buffer having a type and a size, to identify an application providing the audio data as one of the high latency application and a low latency application and, based upon the type of application identified, to select a type of buffer from the group of an operating system buffer, an audio driver buffer and a direct memory access buffer, and to change the size or the number of buffers in which the processing circuit stores audio data, wherein the mobile computing device is a smartphone.

11. The mobile computing device of claim 10, wherein the processing circuit is configured to monitor an audio channel to detect whether the application is a low latency application.

* * * * *